(12) United States Patent
Ghosh (10) Patent No.: US 8,248,425 B2
(45) Date of Patent: Aug. 21, 2012

(54) OPTIMIZATION OF MEMORY BANDWIDTH IN A MULTI-DISPLAY SYSTEM

(75) Inventor: Subir Ghosh, San Jose, CA (US)

(73) Assignee: nComputing Inc., Redwood City, CA (US)

( * ) Notice: Subject to any disclaimer, the term of this patent is extended or adjusted under 35 U.S.C. 154(b) by 485 days.

(21) Appl. No.: 12/560,990

(22) Filed: Sep. 16, 2009

(65) Prior Publication Data

US 2011/0063315 A1    Mar. 17, 2011

(51) Int. Cl.
*G06F 13/00* (2006.01)
(52) U.S. Cl. ............ 345/536; 345/1.1; 345/1.2; 345/1.3; 345/2.1; 345/2.2; 345/2.3; 345/3.1; 345/3.2; 345/3.3; 345/3.4; 345/534; 345/535
(58) Field of Classification Search ............ 345/1.1–3.4, 345/534–536
See application file for complete search history.

(56) References Cited

U.S. PATENT DOCUMENTS

| | | | | |
|---|---|---|---|---|
| 4,991,110 A | * | 2/1991 | Hannah | 345/571 |
| 5,706,203 A | * | 1/1998 | Kawauchi | 702/66 |
| 6,333,750 B1 | * | 12/2001 | Odryna et al. | 345/629 |
| 6,501,441 B1 | * | 12/2002 | Ludtke et al. | 345/1.1 |
| 7,542,010 B2 | * | 6/2009 | Lai | 345/1.1 |
| 7,577,773 B1 | * | 8/2009 | Gandhi et al. | 710/22 |
| 7,683,906 B2 | * | 3/2010 | Senior et al. | 345/539 |
| 8,009,174 B2 | * | 8/2011 | Beric et al. | 345/531 |
| 2006/0236012 A1 | * | 10/2006 | Hayashi | 710/241 |
| 2008/0055191 A1 | * | 3/2008 | Craig et al. | 345/2.2 |
| 2009/0328037 A1 | * | 12/2009 | Sartori | 718/1 |

* cited by examiner

*Primary Examiner* — Xiao M. Wu
*Assistant Examiner* — Todd Buttram
(74) *Attorney, Agent, or Firm* — Schwegman, Lundberg & Woessner, P.A.

(57) ABSTRACT

Graphics display adapters for driving multiple display monitors have become very popular. Graphics display adapters that drive multiple monitors can be used to provide terminal services to multiple independent terminals or be used to provide multiple displays to a single user. Generating video signals for multiple display systems puts a heavy burden on the video memory system since multiple different video signal generators may read from associated frame buffers in a shared video memory system. In one disclosed embodiment, a plurality of video memory read triggers are provided wherein at least two of which are staggered to reduce the load on the video memory system. In response to each read trigger, display data is read from a frame buffer to an associated video signal generation circuit. Each video signal generation circuit then provides a display signal to an associated display screen in a multi-screen environment.

26 Claims, 9 Drawing Sheets

OPTIMIZATION OF MEMORY BANDWIDTH IN A MULTI-DISPLAY SYSTEM

FIELD

The present application relates to the field of computer graphics. In particular, but not by way of limitation, the present application discloses techniques for displaying information in a multi display monitor environment.

BACKGROUND

Centralized computer systems with multiple computer terminals for accessing the centralized computer systems were once the dominant computer architecture. Mainframe computer systems were shared by multiple computer users in a manner wherein each individual computer user had access to a separate computer terminal system coupled to the mainframe computer system. Although personal computers have become the dominant form of computing since the 1980's, there has been a resurgence of the centralized computer system with multiple terminals model of computing. A centralized computer system model provides advantages such as reduced purchase costs, reduced power consumption, increased security, and reduced maintenance costs To service multiple terminal systems, a centralized computer system may simultaneously directly drive the display systems associated with the multiple terminal systems coupled to the central computer system.

In addition to a centralized computer system providing multiple video displays for multiple terminals, individual computer work stations having multiple display system have also become increasingly popular. With multiple display systems coupled to a single computer workstation, a user may simultaneously view multiple documents, images, videos or other video output. Wall Street traders have long used multiple display system in order to monitor many different securities on many different markets. However, many other computer users are now taking advantage of multiple display system workstations. A computer programmer may execute a test program on one display while having a debugger application running on a second display. A computer artist may view a three-dimensional model from multiple angles simultaneously. A single computer system may be used to control multiple large monitors to implement digital signage such as arrival/departure signs in airports. To support these multiple display system capabilities, computer workstations needs a large video memory system for storing multiple frame buffers that also has the needed memory bandwidth to drive the multiple display systems.

BRIEF DESCRIPTION OF THE DRAWINGS

In the drawings, which are not necessarily drawn to scale, like numerals describe the same or similar components. The drawings illustrate generally, by way of example and not by way of limitation, various example embodiments.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are disclosed by way of example with reference to a thin-client system, the teachings can be used in any type of video display system including personal computer systems, High-Definition Televisions (HDTVs), and mobile computer systems. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

Computer Systems with Multiple Display Devices

Modern personal computer systems are so powerful that the computing resources in modern personal computer systems generally sit idle for the vast majority of the time. Thus, the valuable computing resources in modern personal computer systems are being used very inefficiently. To more efficiently use the computing resources in modern personal computer systems, such modern personal computer systems may be shared by multiple users with individual user terminals.

Terminal based computer systems allow for more efficient use of computing resources and reduced computer system maintenance costs. Terminal-based computer systems allow multiple users at individual terminals to share a single computer system and all of the software installed on that computer system. Modern terminal devices may use high-resolution display systems when sharing a server computer system in order to provide each terminal user a rich experience. In this manner, multiple high-resolution terminals coupled to a shared computer system are capable of delivering the functionality of a personal computer system to each terminal user without the cost and the maintenance requirements of allocating a personal computer to each user.

One category of these modern terminal systems is called "thin-client" systems. A thin-client is a terminal system that only has a limited subset of the full capabilities of a traditional computer system. For example, a thin-client terminal system may have an audio output system, a high-resolution video display, and systems for supporting input with a keyboard and mouse. The thin-client terminal system relies on the central computer system to provide processing power, software, main memory, long term storage, and all the other elements associated with a computer system.

Figure 1A:
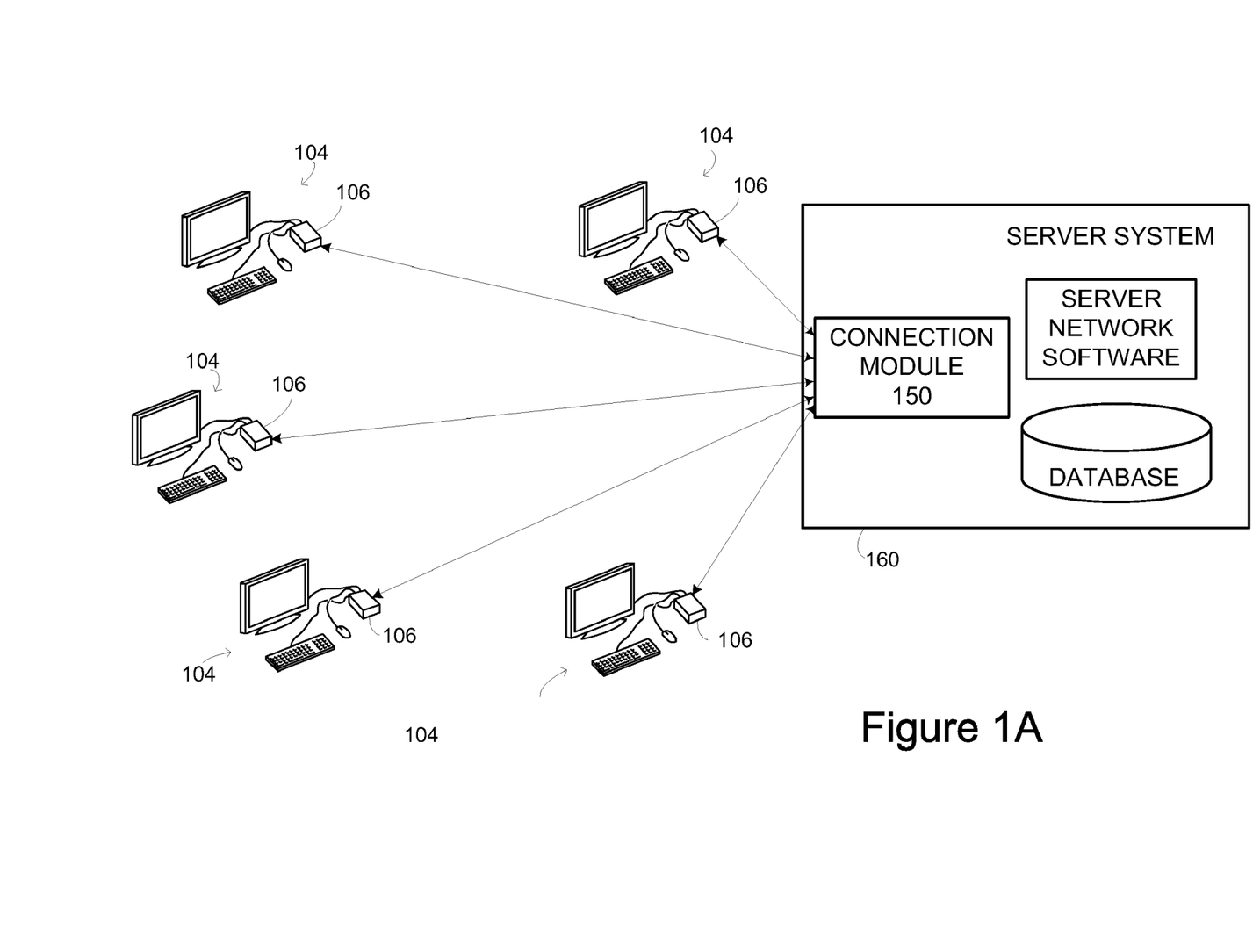
FIG. 1A illustrates a high-level block diagram of multiple thin-client terminal systems coupled to a thin-client server computer system.

FIG. 1A illustrates an example deployment of a terminal based computer system where a server system provides computer resources to multiple client terminal systems. More specifically, FIG. 1A shows a server-based thin-client environment in which a single thin-client server computer system 160 provides computer processing resources to many individual thin-client terminal workstations 104. In the embodiment of FIG. 1A, each of the individual thin-client terminal workstations 104 includes a thin-client terminal device 106 that is coupled to the thin-client server computer system 160 with a bi-directional communication channel that carries output from the server computer system 160 to the thin-client terminal device 106 and user input from the thin-client terminal device 106 to the thin-client server computer system 160.

The thin-client terminal workstations 104 illustrated in FIG. 1A consists of a video display monitor, a keyboard, a cursor control device, and the thin-client device 106. In some embodiments, the thin-client server computer system 160 may also be connected to a local display, keyboard, and cursor control device to support an additional user working directly on the thin-client server computer system 160.

In the example system of FIG. 1A, the thin-client terminal devices 106 act as simple terminal devices for interacting with thin-client server computer system 160. Each thin-client terminal device 106 may transmit its keystrokes and cursor control device movements (e.g., input manipulations by a user) as input to the server computer system 160 and the server computer system 160 transmits video display information or display data as output to the thin-client device 106. Each of the individual thin-client terminal devices 106 of the thin-client terminal workstations 104 is coupled to the thin-client server computer system 160 through the thin-client server computer system's connection module 150. The connection module 150 may be an input/output (I/O) device such as a Peripheral Component Interconnect (PCI) card with multiple input/output connections for connecting each thin-client device 106 to the server computer system 160.

Figure 1B:
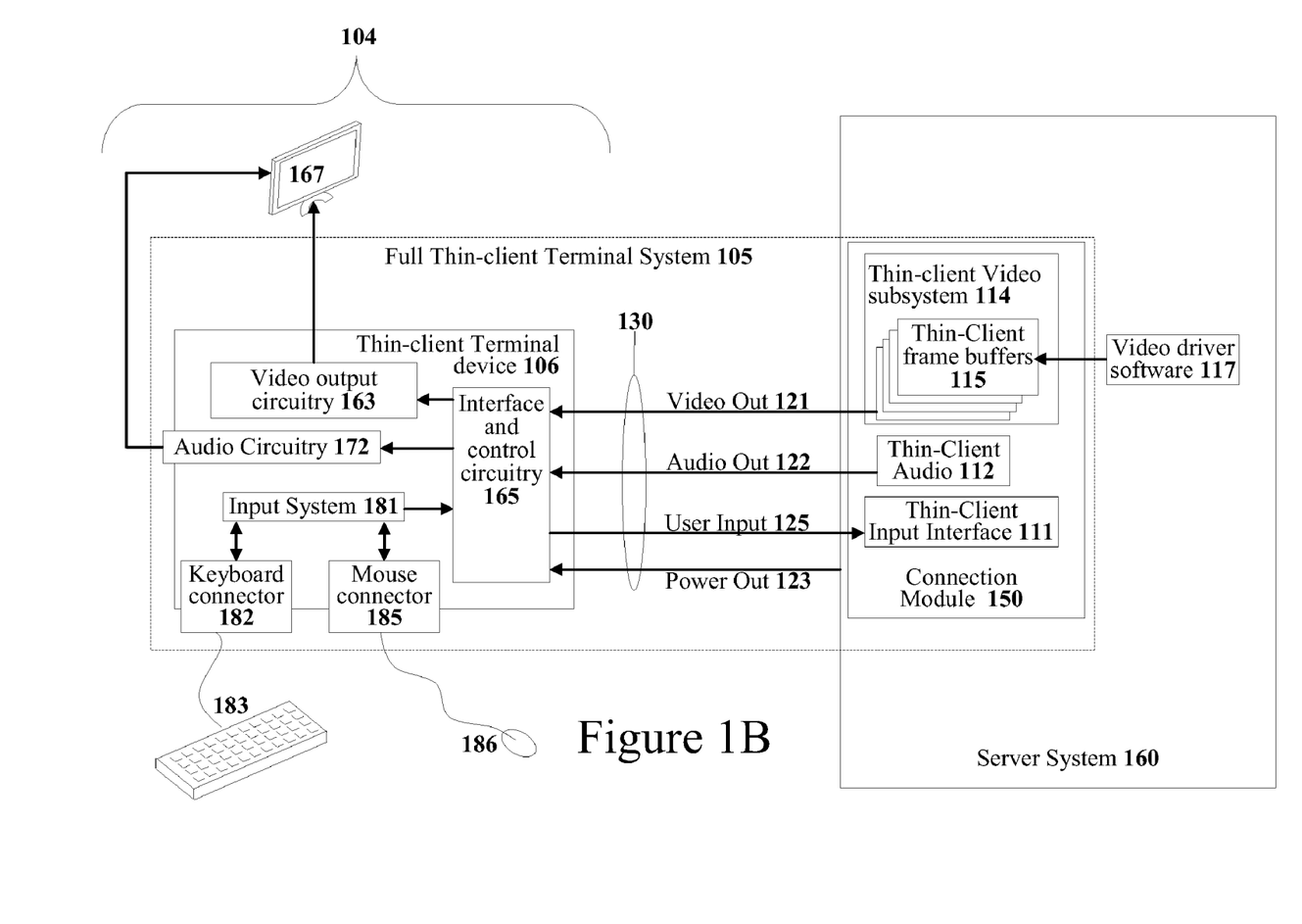
FIG. 1B illustrates a detailed block diagram of a thin-client terminal system coupled to a thin-client server computer system.

FIG. 1B illustrates a detailed block diagram depicting the internals of one particular embodiment of the thin-client terminal device 106 and thin-client server system 160 of FIG. 1A. In the embodiment of FIG. 1B, a server computer system 160 is coupled to one thin-client terminal device 106 of possibly many thin-client terminal systems. When combined with a keyboard, a cursor control device, and a video display system the thin-client terminal device 106 forms a thin-client terminal workstation 104 as depicted in FIG. 1A.

The thin-client server computer system 160 and thin-client terminal device 106 are coupled together using a multi-conductor wire 130. The multi-conductor wire 130 carries input from the user at the thin-client terminal device 106 to the server computer system 160 and output from the server computer system 160 to the thin-client terminal device 106. In the embodiment illustrated in FIG. 1A and FIG. 1B, the thin-client terminal device 106 is a very primitive interface device that mainly functions as a pass-through device. The majority of the hardware to make the thin-client terminal device 106 function actually resides within the server computer system 160. Thus, a thin-client terminal system 105 is conceptually illustrated as the thin-client terminal device 106 and the associated hardware and software within the server computer system 160 that drives the thin-client terminal device 106.

The goal of thin-client terminal workstation 104 is to provide most or all of the standard input and output features of a typical personal computer system to the user of the thin-client terminal system 104. To reduce costs, the thin-client terminal device 106 will not provide the full computing resources of a personal computer system or application software within thin-client terminal device 106. Instead, those features will be provided by the thin-client server system 160 that will interact with the thin-client terminal device 106. In this manner, the cost of the thin-client terminal device 106 will be very low.

In the thin-client embodiment of FIG. 1B, the thin-client terminal device 106 acts largely as a pass through system such that much of the hardware for the thin-client terminal system 104 actually resides within the thin-client server system 160. Specifically, a dashed line around the thin-client terminal device 106 and the connection module 150 within the physical enclosure of the thin-client server system 160 make up the full thin-client terminal system 105. Such an arrangement that places parts of the full thin-client terminal system 105 within the physical enclosure of the thin-client server system 160 allows the thin-client terminal device 106 located at the end user location to be very inexpensive since it is effectively a pass-thru device. The connection module 150 of the full thin-client terminal system 105 within the physical enclosure of the thin-client server system 160 is able to take advantage of the infrastructure in the thin-client server system 160 such as the power system and the high-speed bus system. In one embodiment, the connection module 150 of the full thin-client terminal system 105 is implemented with a PCI card installed in a personal computer system.

In the embodiment of FIG. 1B, a connection module 150 in the thin-client server system 160 is responsible for interacting with all of the attached thin-client terminal workstations 104. In one embodiment, the connection module 150 is implemented on a PCI card installed in a personal computer system.

To generate video output for each thin-client terminal workstation 104 a thin-client video subsystem 114 in the connection module 150 maintains a frame buffer 115 for each of the each thin-client terminal workstations 104 In one embodiment, the frame buffers 115 in the thin-client video subsystem 114 are filled with data from video driver software 117 running on the server system 160. In such an embodiment, the server system operates directly on the thin-client frame buffers 115 to using the video driver software 117 to create a representation of each terminal's display. The frame buffers 115 in the thin-client video subsystem 114 are then used to drive a video signal for display system 167 the of thin-client terminal system 104. Specifically, video display driver circuitry within the thin-client video subsystem 114 reads the frame buffer 115 contents and drives an video output signal 121 for each for each thin-client terminal device 106. In one embodiment, the video output signal 121 is an analog video signal to keep costs low. However, in alternate embodiments, the video output signal 121 may be a digital video signal. Interface and control circuitry 165 within the thin-client terminal device 106 passes the video signal to video output circuitry 163. The video output circuitry 163 passes the video output signal to a video display monitor 167.

Audio output handled in a similar manner wherein an thin-client audio system 112 generates audio output 122 for each thin-client terminal workstation 104. Depending on the implementation, the thin-client audio system 112 may generate digital or analog output on audio output line 122.

Within the thin-client terminal device 106, the interface and control circuitry 165 passes the audio signal to audio circuitry 172. The audio circuitry 172 drives an analog audio output signal. In embodiments wherein the thin-client terminal device 106 receives a digitally encoded audio signal, the audio circuitry 172 decodes the digital audio signal and uses the data to modulate an analog audio signal that is output. In embodiments wherein the thin-client terminal device 106 receives an analog audio signal, the audio output circuitry 172 merely passes the analog audio signal through to the audio output connector. In the embodiment of FIG. 1B, the video display monitor 167 includes built in speakers such that the audio signal is provided to the video display monitor 167 to drive those built-in speakers. If the video display monitor 167 lacks speakers, the analog audio signal may be passed to a set of powered speaker.

User Input to the thin-client terminal device 106 is handled using an input control system 181. The input control system 181 receives keystroke input information from a keyboard 183 (coupled to a keyboard connector 182) and cursor control input information from a computer mouse 186 (coupled to a mouse connector 185). The input control system 181 encodes this keyboard and cursor control input information and passes that input information through interface and control circuitry 165 to a thin-client input interface system 111 in the server system 160. In one particular embodiment, the design of the thin-client terminal device 106 is so efficient that each thin-client terminal device 106 may receive all its needed electrical power from a power out conductor 123 in the multi-conductor wire 130.

On the server side, the thin-client server computer system 160 is equipped with multi-tasking network terminal software for interacting with multiple thin-client systems. As illustrated in FIG. 1B, the connection module 150 in thin-client server system 160 supports the thin-client terminal device 106 as well as any other thin-client terminal devices coupled to thin-client server system 160. Each thin-client terminal device 106 will have its own dedicated frame buffer 115 within the thin-client video subsystem 115 of the connection module 150.

Although the techniques set forth this document will mainly be disclosed with reference to thin-client terminal systems coupled to a central computer system as illustrated in FIGS. 1A and 1B, the techniques described herein are applicable to any type of computer system that drives multiple video display systems. For example, the computer workstation 166 illustrated in FIG. 1C drives multiple display systems (131 to 135). Multiple workstation frame buffers 155 within a video subsystem 151 are used to drive the display systems (131 to 135). The video subsystem 151 of workstation 166 may also use the teachings of the present disclosure.

Video Memory System Requirements

The video memory bandwidth required to support multiple video displays may be quite large depending on the number of video displays supported and the resolution of those video displays. In general, the display resolutions of video display systems are defined by a set of common video standards, such as the Video Electronics Standards Association (VESA) standards, in order to enable use of commodity display monitors. The memory bandwidth required may also vary depending on when each supported video display system is requesting data from the video memory system. When all video display drivers simultaneously request data from the video memory system to drive their associated display systems, the memory bandwidth requirements are at a peak, whereas at other times, the video memory bandwidth required will not be as high.

Figure 1C:
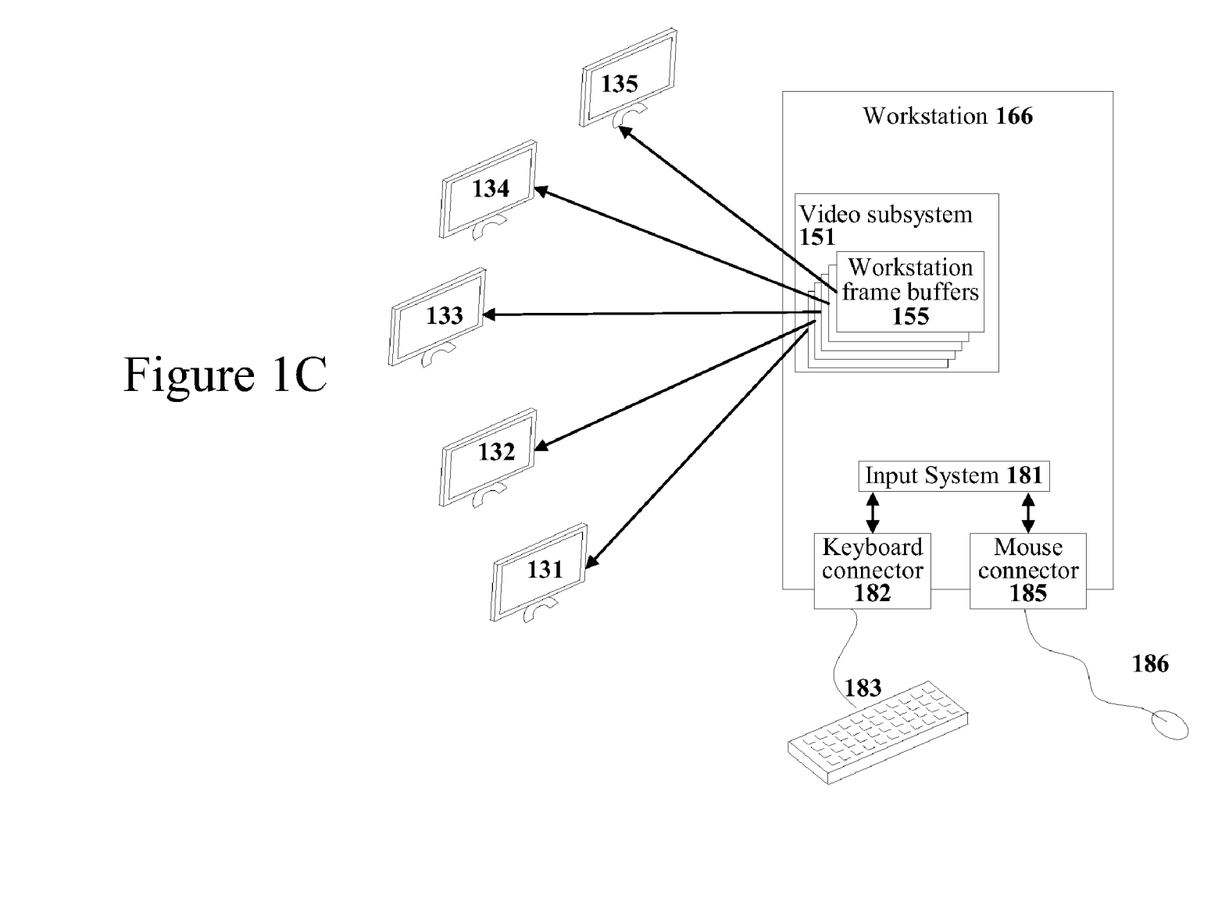
FIG. 1C illustrates a block diagram of a computer workstation coupled to multiple display systems.

As illustrated in FIGS. 1A, 1B, and 1C, a computer system may be implemented with a single video memory system that supports multiple video displays connected to the computer system. The video memory system may include a frame buffer for each video display the system supports. The frame buffer holds a representation of the video display that must be regularly refreshed to the display system. The video memory system may use a single memory that maintains all the frame buffers for all display systems connected to the computer system. That video memory system will have a maximum bandwidth (a rate at which data may be read from the memory system) that cannot be exceeded.

In certain embodiments, each display driver may be read out graphical display information from the frame buffer in the video memory and place that graphical information into a small memory buffer known as a First-In-First-Out (FIFO) buffer. The FIFO buffer may be used as temporary storage to receive data at a certain speed and output that data at a different speed. Using FIFO buffers enables a display controller efficiently buffer graphical information that is then used to drive a display device. The rate at which the display driver reads the data from the frame buffer will depend on the resolution and refresh rate being used.

Figure 2:
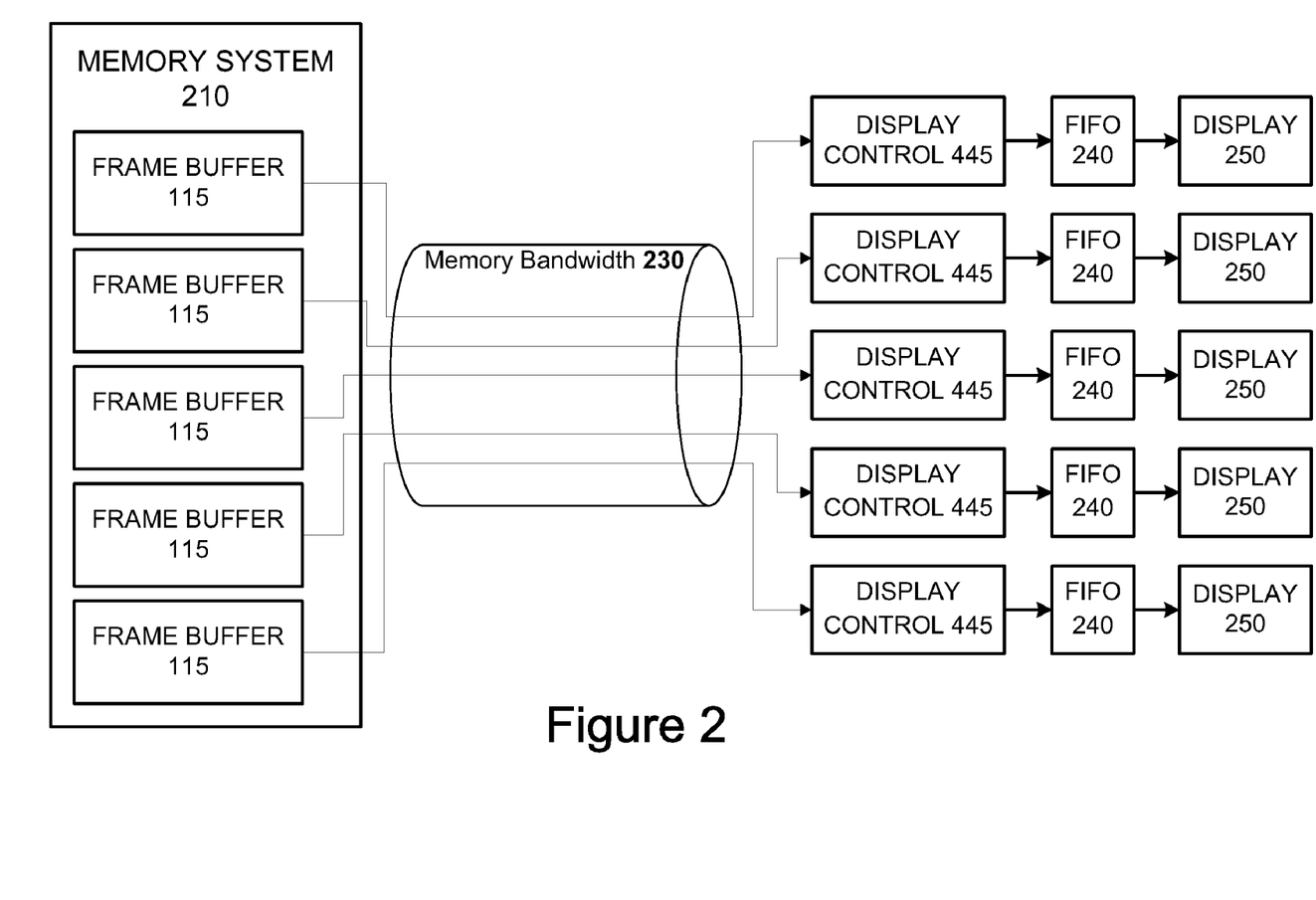
FIG. 2 illustrates a high-level block diagram of an embodiment of a video memory system read by several display controllers which are in turn in communication with several displays.

FIG. 2 illustrates a conceptual diagram that illustrates the video memory bandwidth bottleneck of a video memory system 210 read by multiple display controllers 445 to feed FIFO buffers 240 used to drive associated display systems 250. The FIFO buffers 240 are read by the video signal generator to drive video output signals to drive the associated display systems 250. In one embodiment, the video signal generator outputs an analog video signal to keep the costs low. However, in alternate embodiments, the video signal generator may output digital video signals (such as DVI or HDMI) to drive the display systems 250.

In FIG. 2, video memory system 210 maintains a frame buffer 115 for each of the associated display systems 250. The video memory system 210 may have a maximum memory bandwidth that is conceptually illustrated as a data pipe 230. A video display controller 445 must read screen display data in each frame buffer 115 and provide that data to a corresponding FIFO buffer 240 which in turn feeds the video signal generator (not shown) that generates the video display signal for an associated display system 250. Data will be read out of the frame buffer 115 by the display adapters at a data rate needed for generating a display signal at a particular screen resolution and frame rate. However, the combined speed of all the data transfers from the frame buffers 115 in the video memory system 210 by the display controllers 445 cannot exceed the maximum memory bandwidth of the video memory system 210 as conceptually represented by data pipe 230.

To further illustrate the video memory bandwidth issue, an example is hereby provided. If a video memory system is constructed with double-data-rate (DDR) memory, a 32 bit wide (4 bytes) data bus, and runs at 133 MHz then the maximum memory bandwidth of the video memory system is provided by the following calculation:

$$133\ \text{Mhz} * 2(\text{double rate}) * 4\ \text{bytes} = 1.064\ \text{Gigabytes per second}.$$

The total rate of data being read out by display controllers and copied into the FIFOs for the display cannot at any time exceed that maximum memory bandwidth amount. Note that in addition to the read-out to the frame buffers, there are also other applications that wish to access the same video memory. Specifically, referring to FIG. 1B, the server system 160 must provide the display screen updates to the thin-client frame buffers 115 used to drive the terminal display systems. However, such screen display memory updates are generally much slower than the constant high speed read-outs of the frame buffers 115 in the video memory to generate the video refreshes to a display system. Thus, the writes to the video memory system must be accounted for in a real design but will be ignored for simplification in this illustrative example.

When reading from video memory system 210, the total data rate of display drivers for each monitor must not exceed the memory bandwidth requirements of the video memory system 210 in terms of average memory bandwidth usage or peak memory bandwidth usage. The average memory bandwidth is the memory bandwidth used by all the display drivers averaged over a period of time. The peak memory bandwidth usage is the highest memory bandwidth at any one particular time.

The memory bandwidth required to drive a single 1280×1024 display with a refresh rate of 60 Hz and color depth of 16-bits (2 bytes/pixel) is 1280×1024*2*60=157.3 MB/sec. For total of 5 such displays, the total average bandwidth requirement is 157.3*5=786.5 MB/sec. Since this average memory bandwidth requirement is much less than 1.06 GB/sec bandwidth available from the memory system described above, it would appear that memory system would be sufficient to drive all five display systems. However, the peak memory bandwidth requirements can overtax the video memory system as set forth below. Specifically, if all frame buffers are accessed simultaneously the memory bandwidth of the video memory system may be exceeded as set forth below.

The following Table 1 lists examples of some of the most commonly used standard monitor display resolutions, refresh frequencies, and their corresponding pixel clock frequencies. The pixel clock frequency is the frequency at which the display system must render pixels including all of the pixel times in the vertical and horizontal refresh periods. For example, the total number of pixels (including refresh periods) for a 1024 by 768 is 1344 by 806. Thus, the pixel frequency for a 1024 by 768 display at 60 frames per second is calculated as follows:

Pixel Frequency=1344*806*60 Hz=65 Mhz

In addition, the amount of time required to draw one pixel on a display system has been calculated and provided. Note that the number of pixels on screen multiplied by the amount of time to draw a single pixel does not equal the time to draw a full frame since the refresh time must also include the vertical and horizontal refresh intervals.

TABLE 1

Pixel Rates

| Number of active pixels in one horizontal line | Number of active lines in one screen | Frame frequency (Hz) | Pixel Clock frequency (Mhz) | Amount of time to draw one pixel (nsec) |
|---|---|---|---|---|
| 1024 | 768 | 60 | 65 | 15.4 |
| 1280 | 1024 | 60 | 108 | 9.3 |
| 1440 | 900 | 60 | 106.5 | 9.4 |

A display monitor must receive information for one pixel during each pixel time period as defined by the standard, or the monitor will not be able to display the data properly. With multiple displays, the transmission rate for each display is combined and must remain within the maximum bandwidth of the memory system.

Using the amount of time per pixel values from Table 1, the following Table 2 shows example amounts of data for each pixel (2 bytes) and the data rate required to support various numbers of displays. The assumption is 16 bits for color and all displays' active pixels are drawn at the same time. The data rates are calculated with the following formula:

(clock frequency)*(bytes/pixel)*(number of displays)
=total data rate

TABLE 2

Data Rates for Multiple Displays

| Pixel Clock Frequency (Mhz) | Data per pixel (bytes) | Number of displays | Peak data rate for all displays accesses frame buffers concurrently (MB per second) |
|---|---|---|---|
| 65 Mhz | 2 bytes | 1 | 130 Megabytes/second |
| 65 Mhz | 2 bytes | 3 | 390 Megabytes/second |
| 65 Mhz | 2 bytes | 4 | 520 Megabytes/second |
| 65 Mhz | 2 bytes | 5 | 650 Megabytes/second |
| 108 Mhz | 2 bytes | 1 | 216 Megabytes/second |
| 108 Mhz | 2 bytes | 3 | 648 Megabytes/second |
| 108 Mhz | 2 bytes | 4 | 864 Megabytes/second |
| 108 Mhz | 2 bytes | 5 | 1080 Megabytes/second |
| 106.5 Mhz | 2 bytes | 1 | 213 Megabytes/second |
| 106.5 Mhz | 2 bytes | 3 | 639 Megabytes/second |
| 106.5 Mhz | 2 bytes | 4 | 852 Megabytes/second |
| 106.5 Mhz | 2 bytes | 5 | 1065 Megabytes/second |

As illustrated in Table 2, there are two cases where it is impossible to support a certain number of display systems reading concurrently from the video memory system with the example memory system. For example, since the example memory system only supports a maximum memory bandwidth of 1.06 GBytes/second and the memory bandwidth required to run five displays at 1280×1024 resolution is 1.08 GBytes/second the system will be unable to support that resolution. The FIFOs in the display hardware would be able to drive the displays at the proper frequency but those FIFOs would run out of display data because the image stored in the shared memory system cannot be read quickly enough. Similarly, at the display resolution of 1440×900, the required bandwidth is 1.065 GBps which is slightly above the theoretical maximum memory bandwidth in the example system. In this case, there is no additional memory bandwidth available to update the frame buffers when new display data is available.

The other factor that affects the memory bandwidth is latencies inherent in the memory system. In the example system, 1.06 GBps is the theoretical maximum. However, the actual maximum transfer speed of the memory system depends on many different factors and often the actual maximum is well below the theoretical maximum memory bandwidth. The theoretical maximum memory bandwidth assumes memory accesses always be directed to currently available memory pages always. Such is not the case. Depending on memory accesses from other components (CPU, PCI, etc.) as well as the sequence at which the memory is accessed by different display engines, a particular memory page requires replacement with a new one causing a loss of performance on the memory side. Memory page size varies from memory to memory and is also dependent on the system configuration (memory data width). For a particular 32 bit DDR2 memory, page size can be 4 KB with 4 or 8 (memory dependent) pages to be readily available at any point of time.

As set forth above, the video memory bandwidth requirements to drive multiple displays is quite high. In order to handle the memory bandwidth requirements of the multiple displays, a video memory system with greater bandwidth capabilities may be used. For example, a high-speed video memory that is capable of handling frame buffer requests from all of the displays at the same time may be used to implement video memory system 210. However, such specialized video memory systems with greater bandwidth capabilities come at the expense of greater cost.

To avoid the need for expensive high-speed video memory devices, the present disclosure introduces a method of reducing the video memory requirements. In the proposed system, the high memory bandwidth requirements of driving multiple display systems may be addressed by reducing the peak memory bandwidth requirement. Reducing the peak memory bandwidth requirements may be accomplished by strategically scheduling or staggering the reading of display data from the video memory system in a manner that takes advantage of the video blanking intervals (i.e., blanking time) of each display system.

Due to the historical use of cathode ray tube displays systems, an individual display image or frame is "drawn" on a display screen by successively sweeping an electrical signal horizontally across the display screen one line at a time, from top to bottom. At the end of each horizontal line, there is generally a period of time before the next horizontal line is drawn. This period of time is known as a horizontal blanking interval (i.e., horizontal blank time). (In a traditional cathode ray tube display system, this time allowed the display electronics to redirect the electron gun back to the beginning of the next horizontal line.) When all of the successive horizontal lines of a display screen are drawn, there generally is a period of time before the next temporally successive video frame is drawn. This period of time is known as a vertical blanking interval (i.e., vertical blank time). In a traditional cathode ray tube, the vertical blanking interval allowed a display system to move the electron gun back to the top of the display system. Modern flat panel displays that may not draw a frame by sweeping an electrical signal horizontally across the display one line at a time generally also support horizontal and vertical blanking intervals for compatibility reasons.

Figure 3:
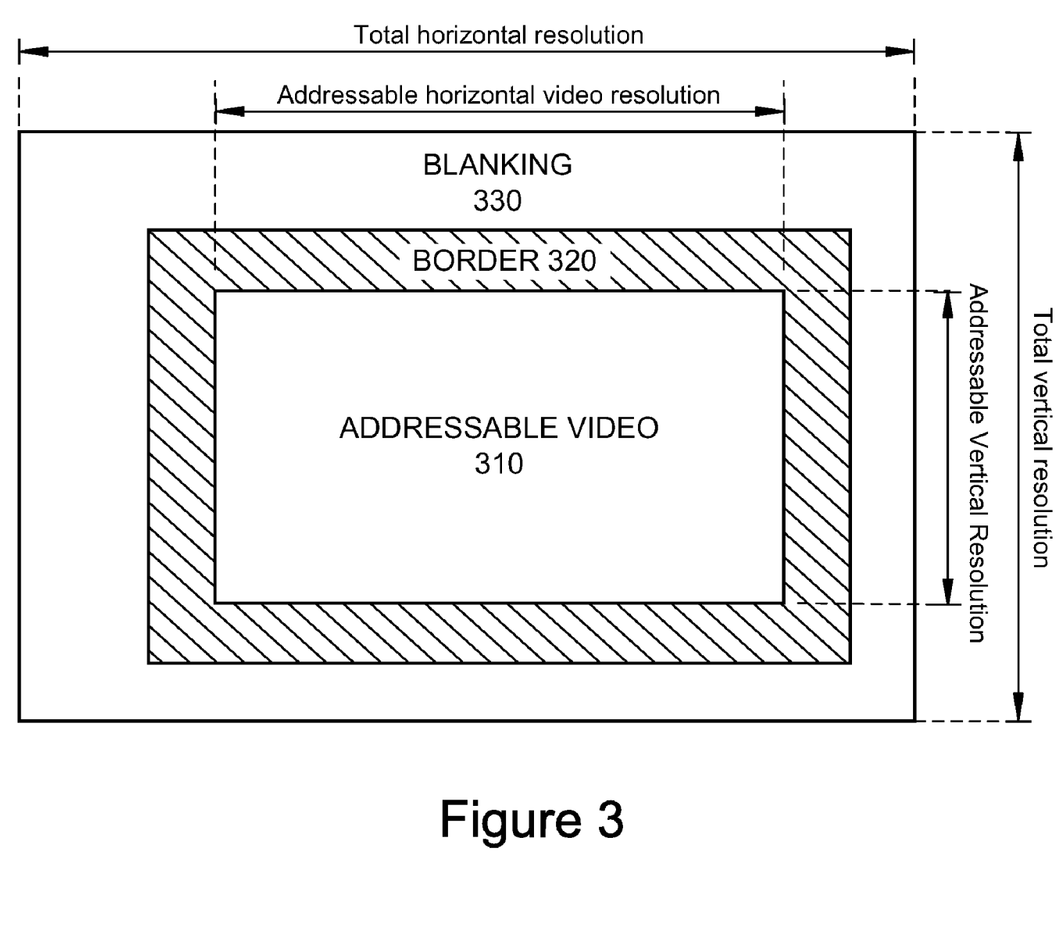
FIG. 3 illustrates a block diagram of a generic video frame according to various embodiments.

FIG. 3 illustrates a conceptual diagram of a generic video frame that graphically illustrates the display area and the blanking intervals. The screen geometry includes an addressable video portion 310 that is actually visible on a display and a blanking interval 330 that represents a time period wherein nothing is displayed. In one embodiment, there is also a border around the addressable video portion 310 that represents the darkened area on the edge of a cathode ray tube display system where no image is being rendered. In some embodiments, display data only needs to be transferred for addressable video portions 310 of the video frame.

In various embodiments, the use of the memory bandwidth for a video memory system is optimized by scheduling or staggering the reading of data from the video memory system to take advantage of the blanking interval (i.e., blanking time) of each display. For example, memory reads from the video memory system may be staggered or synchronized such that not all display controllers will simultaneously request display data from the associated frame buffers stored in the memory system at the same time. In this way, the peak bandwidth requirements may be reduced. In one embodiment, the display controllers may be started in a particular sequence such that not all display controllers will need display data from the memory system at the same time.

Figure 4:
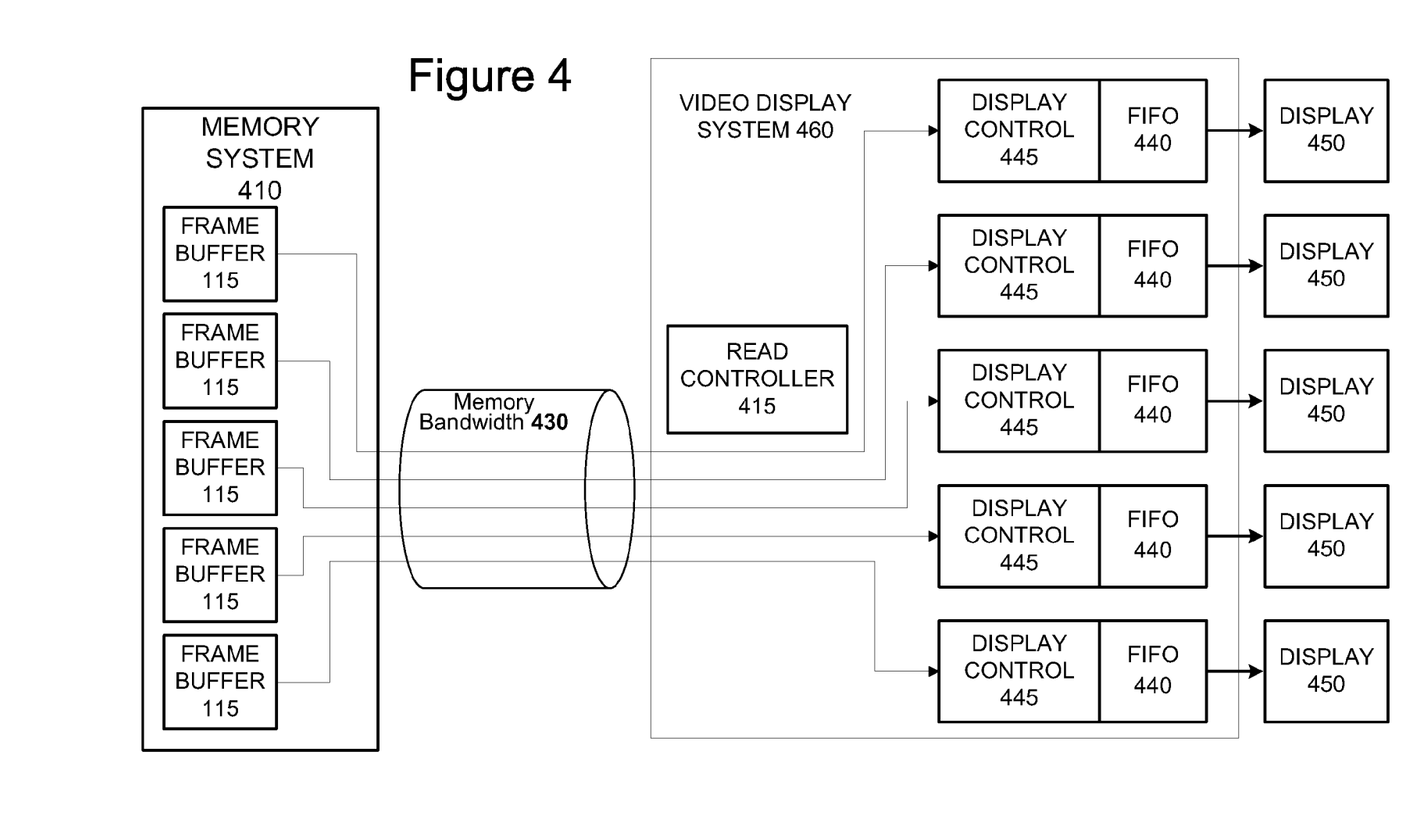
FIG. 4 illustrates a block diagram illustrating a video memory system that is read by several display controllers under the control of read controller in accordance with various embodiments.

FIG. 4 is a block diagram illustrating a video memory system 410 in communication with a video display system 460 having one or more display controllers 445 that feed FIFO buffers 440. The FIFO buffers 440 are in turn in communication with several display systems 450 in accordance with various embodiments. The video memory system 410 maintain frame buffers 115 for multiple associated display systems 450. The one or more frame buffers 115 may be used to support multiple display systems 450 on terminal systems and thus form part of a thin-client server system configured to run virtualization software to provide software applications to multiple terminal system users. The video memory system 410 may have a maximum memory bandwidth conceptually represented by data pipe 430.

A read controller 415 in the video display system 460 coordinates reads of image data from the video memory system 410 of FIG. 4. The read controller 415 is responsible for coordinating access by display controllers 445 into the frame buffers 115 in the video memory system 410. The read controller 415 may be configured to stagger, schedule, or synchronize the reading of data from the individual frame buffers 115 of the video memory system 410. For example, the read controller 415 may generate a read trigger for the display controller 445 associated with each FIFO buffer 440 that causes the triggered display controller 445 to read display data from a frame buffer 115 and place that display data in the associated FIFO buffer 440. The display data (e.g., horizontal line) in the FIFO buffer 440 may then be used by a video signal generator (not shown) to generate a display signal for the associated display system 450.

The read controller 415 may generate read triggers such that at least two of the read triggers are staggered in manner that prevents all of the frame buffers 115 from being accessed simultaneously. The staggering of the read triggers may be based on one or more of the following: a constant time interval, the refresh rates supported, the number of displays supported, the total resolution supported, the addressable video resolution supported, etc.

Display controllers 445 may be configured to start a read process for one of the FIFO buffers 440 in response to a read trigger from the read controller 415 in order to read display data from the corresponding frame buffer 115 into the FIFO buffer 440. Although in FIG. 4, more than one display controller 445 is shown, in other embodiments, just one display controller 445 may be configured to start the read processes for all of the FIFO buffers 440.

In some embodiments, a counter may be used to help stagger or schedule the display controller 445 reading of graphical data from the frame buffers 115 of the video memory system 410. For example, the read controller 415 may determine a "start count" for each display controller 445 and generate a read trigger at the correct time to enable the display controller 445 to read from its associated frame buffer 115. The start count may be used to determine when the read controller 415 should generate a start signal for a particular display controller 445 and associated FIFO buffer 440. In various embodiments, the counter may be a timer, a counter that counts clock signals, a pixel clock (i.e., pixel counter), or any other appropriate signal.

Figure 5:
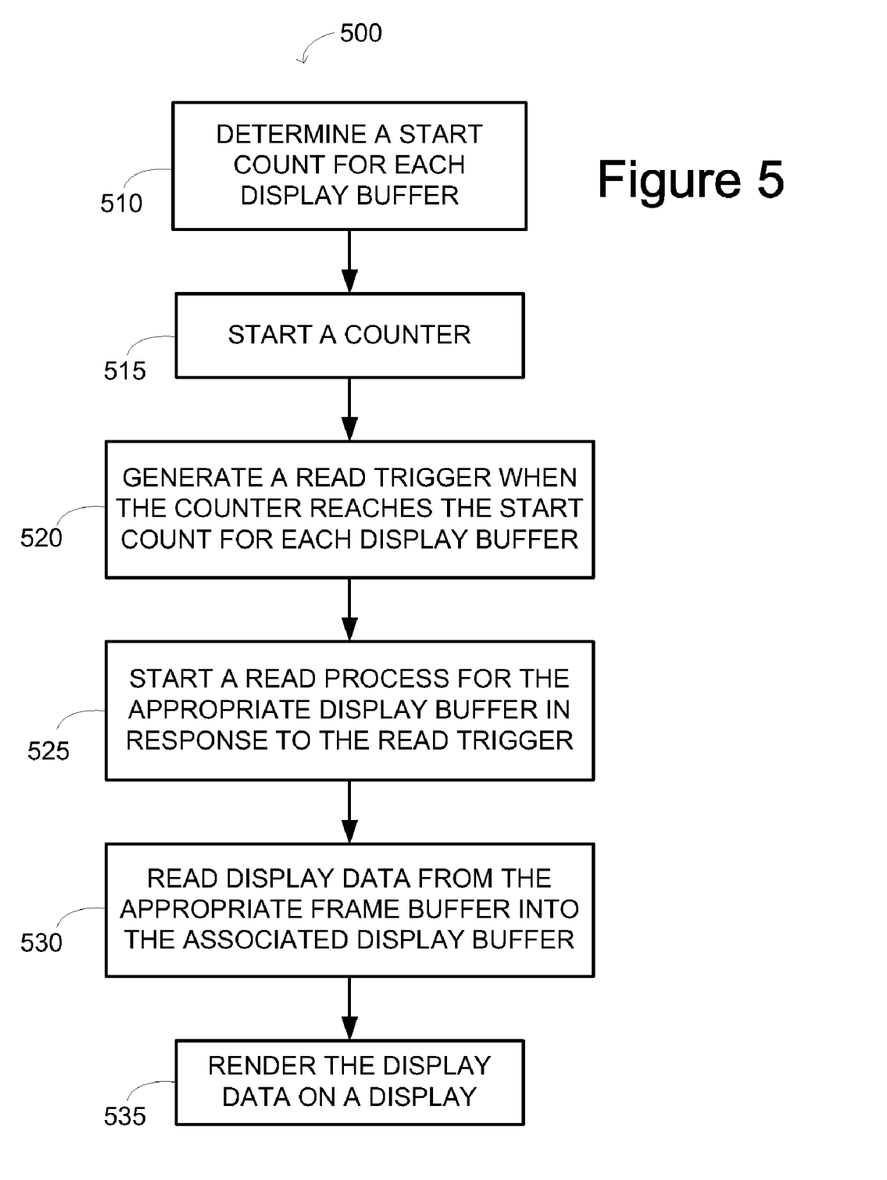
FIG. 5 is a flow diagram illustrating an embodiment of a method to optimize memory bandwidth.

FIG. 5 illustrates a flow diagram describing one embodiment of a method 500 to optimize video memory bandwidth. The method 500 may be performed by processing logic that may comprise hardware (e.g., dedicated logic, programmable logic, microcode, etc.), software (such as run on a general purpose computer system or a dedicated machine), or a combination of both.

At operation 510, a controller (such as read controller 415) may determine a start count for each display controller 445. The start counts may be determined dynamically as each additional display system comes online and requires data from the video memory system or the start. The start count may be calculated based on a number of factors. In one embodiment, the start count may be calculated based on the resolution of the addressable video portion of a supported display (vertical and horizontal), the total resolution of a supported display (vertical and horizontal), the refresh rate of a supported display, and the number of displays supported by the memory system. However, in a simple system, the start count may also be a constant time interval.

For illustration purposes, an example scenario will be presented for a five display system. In the example scenario, a video memory system may be configured to support five display systems wherein each display is configured to have an addressable video resolution of 1280×1024 pixels. Although the addressable video resolution is 1280×1024 pixels, the total resolution may be bigger after taking into account for any border around the addressable video portion and the (horizontal and vertical) blanking time. For example, a display with an addressable video resolution of 1280×1024 may have a total resolution of 1688×1066 according to a Video Electronics Standards Association (VESA) standard.

To reduce the peak bandwidth requirements on the video memory system, the start counts may be staggered based on the horizontal resolution. With the total horizontal resolution being 1688 pixels, the start counts may be offset at 337 pixels (1688 total horizontal pixels/5 displays). Therefore, a start count for the first display controller would be at pixel count 0, the start count for the second display controller would be at pixel count 337, the start count for the third display controller would be at pixel count 674, the start count for the fourth display controller would be at pixel count 1011, and the start count for the fifth display controller would be at pixel count 1348.

Start counts may also be determined based on the vertical resolution of a display. In the example discussed above, a display with a vertical addressable video resolution of 1024 pixels may have a total vertical resolution of 1066 pixels. The start counts determined based on the vertical resolution may be offset at 213 pixels (1066 total vertical pixels/5 displays). Therefore, a start count for the first display controller would be at line count 0, the start count for the second display controller would be at line count 213, the start count for the third display controller would be at line count 426, the start count for the fourth display controller would be at pixel count line, and the start count for the fifth display controller would be at line count 852. In another embodiment, start counts may be determined based on a combination of the horizontal resolution and the vertical resolution.

In another embodiment, the start counts may be determined based on the non-addressable portion of a frame or blanking time. For example, a display with a horizontal addressable video resolution of 1280 pixels may have a total horizontal resolution of 1688 pixels. Therefore, non-addressable portion of a frame is 408 pixels (1688−1280=408) pixels. The offset between start counts may be equal to or a function of the non-addressable portion of the frame. In this case, the offset may be 408 and start counts may be 0, 408, 816, 818, and 1226.

In another embodiment, the start count may be determined by dividing the total time a monitor takes to cover an entire line of pixels (addressable and non-addressable) by the number of displays and using the resulting number to stagger the start counts. The start count may also be staggered using the time a monitor uses for the non-addressable portion of a resolution. In still other embodiments, the staggering of the start counts resulting in staggered read triggers may be based on an arbitrary time interval, the bandwidth of the memory system, and the number of displays using the memory system.

Once the start counts are determined, a counter may be started at operation 515 in FIG. 5. This counter may count a pixel clock (i.e., a pixel counter, also sometimes known as a dot clock) or any other counter or timer that is compatible with the start count. At operation 520, the read controller generates a read trigger when the counter reaches the start count for one of the display controllers.

Referring to the example discussed above where the start counts are based on the horizontal resolution and the horizontal resolution is 1280, there would be a read trigger generated for the first display controller, with an associated start count of 0, when a pixel counter starts at 0. A second read trigger may be generated for the second display controller, with an associated start count of 337, when the counter reaches 337. Additional read trigger signals would be generated for the other display controllers when the counter reaches the next multiple of 337 (674, 1011, and 1348). Since the start count of the fifth monitor is at pixel time 1348, the reads for fifth monitor will not begin until the reads for the first display controller are completed at time 1280. And since amount of time for the horizontal refresh, the time for inactive number of pixels (1688−1280=408), is larger than the 337 pixel clock stagger time, the first display controller will not begin reading again until the second display controller has completed its reading. Specifically, the first display controller will begin a new horizontal scan after 1688 pixel clocks (1280 addressable pixels and 408 non addressable pixel times in the horizontal refresh) after the second display controller completes its horizontal row at pixel clock time 1617 (after 1280 pixels rendered beginning at pixel time 337). Thus, at no point in time will all five display controllers read data from the video memory system at the same time. The peak memory bandwidth requirement is thereby reduced because at a maximum, only four display controllers will read data from the video memory system at the same time.

In one embodiment, the read controller generates a read trigger and sends it to a specific display controller. However, in other embodiments, the read controller broadcasts differentiated start signals to all display controllers. For example, a "Start1" signal may be generated to start the read process for the first display controller, a "Start2" signal may be generated to start the read process for the second display controller, a "Start3" signal may be generated to start the read process for the third display controller, and so on and so forth.

At operation 525, a triggered display controller starts a read process for its FIFO buffer in response to the read trigger sent at operation 520. The triggered display controller will read display data from a frame buffer in the video memory system into the associated FIFO buffer at operation 530. At operation 535, data in the FIFO buffer may be rendered on a display. Note that that the stages from 520 to 535 will be performed repeatedly. If the system is using a dynamic system, then when a new display is added (or the parameters of an existing display system are changed) then the system will return back to stage 510 to recalculate start counts for each display system.

In some embodiments, subsequent signals may be sent to ensure synchronization of the FIFO buffers. In other embodiments, however, no further signals are required.

Figure 6:
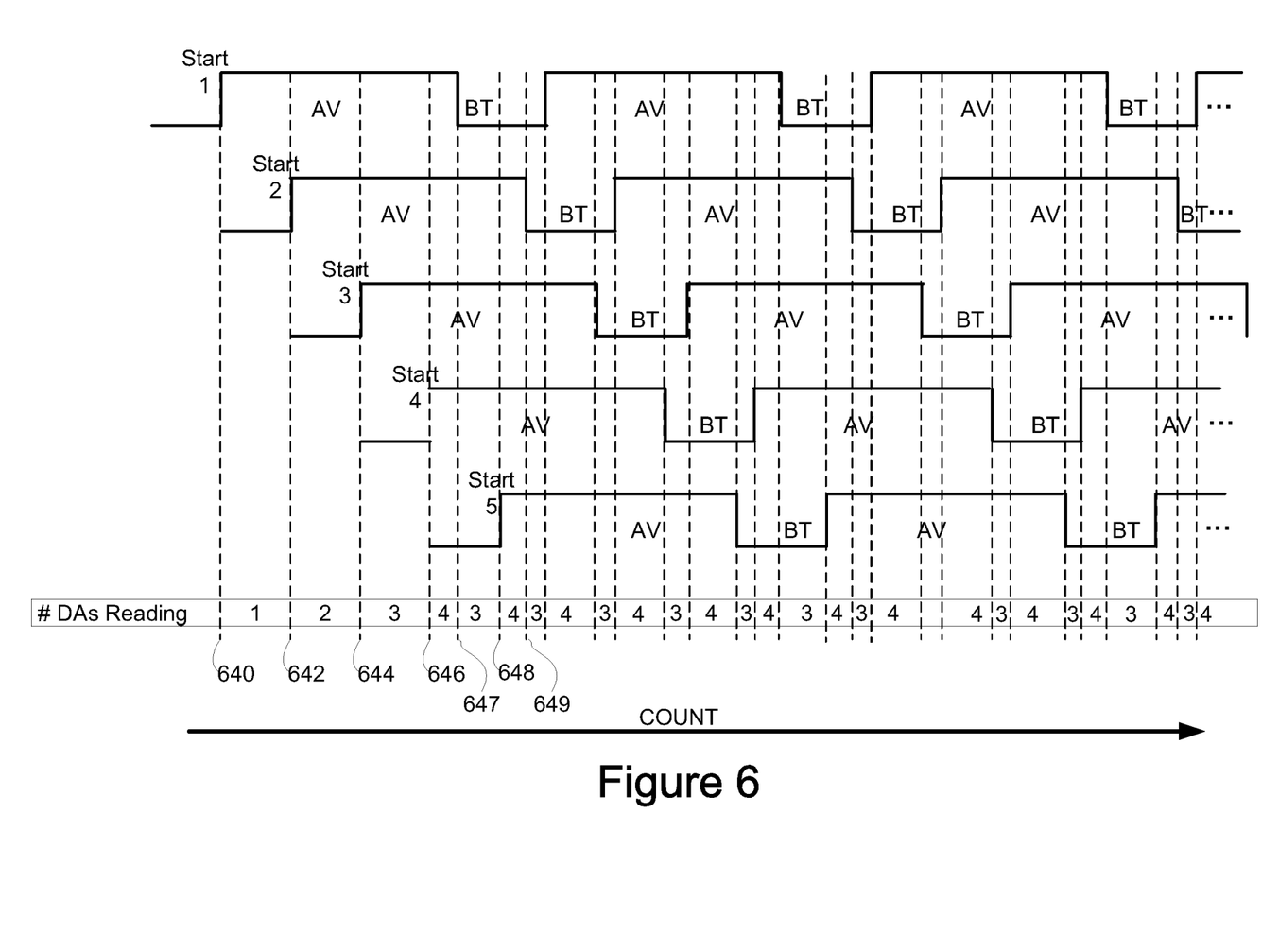
FIG. 6 is a timing diagram illustrating the performance of an example embodiment.

FIG. 6 illustrates a timing diagram depicting the performance of an example embodiment. In the example embodiment, five displays with an addressable video resolution of 1280×1024 and a total resolution of 1688×1066 are supported. The start counts are staggered based on the horizontal resolution with an offset of 337 pixels (1688 total horizontal pixels/5 displays). Therefore, a start count for the first display controller would be at pixel count 0 (and end at pixel count 1280), the start count for the second display controller would be at pixel count 337 (and end at pixel count 1617), the start count for the third display controller would be at pixel count 674 (and end at 1954, the start count for the fourth display controller would be at pixel count 1011 (and end at 2291), and the start count for the fifth display controller would be at pixel count 1348 (and end at 2628).

In response to the start signals, one or more display controllers may start the read process from the frame buffer. In this example, the display controller may begin to read display data from the frame buffer corresponding to the first line of pixels (1280 pixels) of the addressable video (labelled "AV" in FIG. 6). This is followed by a blanking time, labelled "BT" in FIG. 6, of 408 pixels (total horizontal time resolution of 1688 pixels–horizontal addressable video resolution of 1280 pixels=408 pixels). This process repeats until all lines of a video frame are read out of the frame buffer.

Referring to FIG. 6, at pixel count 0 (designated by time marker 640) a read controller generates a "Start 1" signal and the frame buffer read process is started for the first display controller. At count 337 (designated by time marker 642) the read controller generates a "Start 2" signal and the frame buffer read process is started for the second display controller. At count 674 (designated by time marker 644) the read controller generates a "Start 3" signal and the read process is started for the third display controller. At count 1011 (designated by time marker 646) the read controller generates a "Start 4" signal and the read process is started for the fourth display controller.

At this point, there are four display controllers concurrently accessing the shared video memory. If another display controller were to begin accessing the shared video memory, the maximum bandwidth of the memory may be exceeded. However, at time count 1280 (designated by time marker 647) the frame buffer read performed by the first display controller will end such that there are now only 3 display controller concurrently accessing the shared memory. Then at count 1348 (designated by time marker 648) the read controller generates a "Start 5" signal and the read process is started for the fifth display controller such that there are four display controllers reading from the memory. The second display controller will then stop reading at count 1617 (designated by time marker 648) before the first display controller begins reading again at count 1688. Thus, one of the four display controllers will always stop reading before a subsequent display controller begins reading. This means that the number of display controllers concurrently reading from the shared memory will oscillated between 3 and 4 as illustrated in FIG. 6.

As can be seen in FIG. 6, staggering the start of the five display controllers prevents more than four display controllers from reading a frame buffer in the video memory system at the same time. Specifically, at the bottom of FIG. 6, the number of display controllers concurrently reading from the video memory at a specific interval is shown in the row labelled "# DCs Reading" (number of Display controllers concurrently reading) Thus, although there are five different display systems being provided with graphical display data, at most only four display adapters will be reading from the video memory system simultaneously since at least one of the display adapters will be within a horizontal blanking time (market as "BT" in FIG. 6.) wherein no display data is needed.

Figure 7:
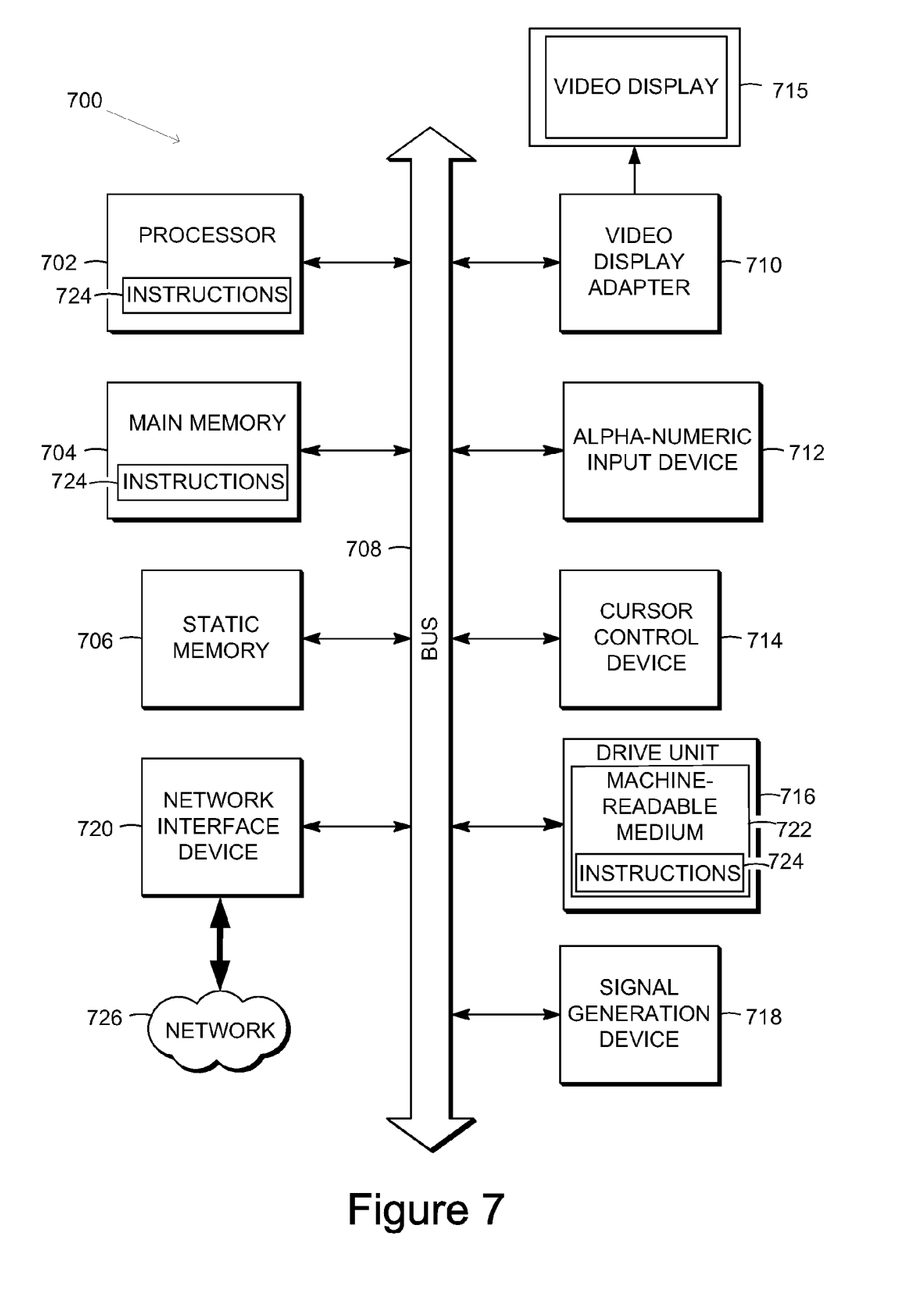
FIG. 7 illustrates a diagrammatic representation of machine in the example form of a computer system within which a set of instructions, for causing the machine to perform any one or more of the methodologies discussed herein, may be executed.

FIG. 7 illustrates a diagrammatic representation of machine in the example form of a computer system 700, in accordance with an example embodiment, within which a set of instructions 724, for causing the machine to perform any one or more of the methodologies discussed herein, may be executed. The machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display adapter 710 that drives a video display system 715 such as a Liquid Crystal Display (LCD) or a Cathode Ray Tube (CRT). The computer system 700 also includes an alphanumeric input device 712 (e.g., a keyboard), a cursor control device 714 (e.g., a mouse or trackball), a disk drive unit 716, a signal generation device 718 (e.g., a speaker) and a network interface device 720.

In an example embodiment, a CPU is a device that controls overall operation of computer system 700. The CPU operates in multiple states and controls operations of receiving data from various input devices, processing the data, and sending the process result to an output device. The CPU includes an arithmetic logic unit (ALU) and a control unit. The ALU performs comparison, decision, and calculation operations, and the control unit decodes and executes instructions. The ALU includes: an adder for adding numbers; an accumulator for temporarily storing the result of arithmetic and logic operations; and registers. The control unit includes a program counter for controlling an execution order of programs, and an instruction register for temporarily storing a current instruction, and an instruction decoder for decoding the stored instruction to send a control signal to a corresponding device. Therefore, CPU based system 700 can perform independently based on instructions programmed in memory regardless whether or not it is connected to other computers, a network or other electronic devices.

The disk drive unit 716 includes a machine-readable medium 722 on which is stored one or more sets of computer instructions and data structures (e.g., instructions 724 also known as 'software') embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

The instructions 724 may further be transmitted or received over a network 726 via the network interface device 720 utilizing any one of a number of well-known transfer protocols (e.g., FTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

In a personal computer system, such as the computer system 700 of FIG. 7, a video display adapter 710 drives a local video display system 715 such as a Liquid Crystal Display (LCD), a Cathode Ray Tube (CRT), or other video display device. Currently, most personal computer systems are connected with an analog Video Graphics Array (VGA) connection. Many newer personal computer systems are using digital video connections such as Digital Visual Interface (DVI) or High-Definition Multimedia Interface (HDMI). However, these types of video connections are generally used for short distances. The DVI and HDMI connections require high bandwidth connections. The video display adaptor 710 may in addition, or instead, drive a remote display connected to one or more network terminals connected via a network (e.g., a local area network (LAN) or wide area network (WAN)).

In an example situation where the graphics adaptor 710 interfaces with a plurality of networked terminal devices which are thin-clients (e.g., the clients may or may not include a CPU), the amount of bandwidth required for transmitting a video signal may be reduced. For example, over-the-air terrestrial, satellite, and cable digital video broadcasts desire reduced bandwidth video in order to transmit as many channels of video as possible.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated.

What is claimed is:

1. A method of reading display data from a plurality of frame buffers to a plurality of video signal generation circuits, the method comprising:
   providing a plurality of read triggers, at least two of the read triggers being staggered, the staggering of the read triggers being based on dividing a total resolution supported by a display screen by a number of display screens supported;
   in response to each read trigger, reading display data from a frame buffer of the plurality of frame buffers to an associated video signal generation circuit of the plurality of video signal generation circuits, each video signal generation circuit for generating an associated video signal of an associated display screen of the plurality display screens; and
   displaying the display data on the associated display screen.

2. The method of claim 1 wherein the read triggers are staggered to reduce a bandwidth required to read the display data relative to a bandwidth required to read the display data from the plurality of frame buffers at the same time.

3. The method of claim 1 further comprising:
   staggering the read triggers based on a constant time interval.

4. The method of claim 1 further comprising:
   staggering the read triggers based on at least one of the number of video signal generation circuits in the plurality of video signal generation circuits and a refresh rate supported by each video signal generation circuit.

5. The method of claim 1 further comprising:
   staggering the read triggers based on at least one of a horizontal addressable video resolution, a vertical addressable video resolution, a total horizontal resolution supported by each video signal generation circuit of the plurality of video signal generation circuits and a total vertical resolution supported by each video signal generation circuit of the plurality of video signal generation circuits.

6. The method of claim 1 wherein each video signal generation circuit of the plurality of video signal generation circuits supports the same resolution and refresh rate.

7. The method of claim 1 wherein the associated display screen comprises a thin-client terminal system.

8. The method of claim 1 wherein each video signal generation circuit forms part of a thin-client connectable to an associated display screen.

9. The method of claim 1 wherein the plurality of video signal generation circuits form part of a server system configured to run virtualization software to provide software applications to a plurality of associated thin clients.

10. The method of claim 1 further comprising:
    starting a counter; and
    generating a read trigger when the counter reaches a start count for each video signal generation circuits of the plurality of video signal generation circuits.

11. The method of claim 10 wherein the start count for each video signal generation circuit is determined dynamically based on a number of displays supported.

12. The method of claim 10 wherein the counter is a pixel counter.

13. An apparatus comprising:
    a plurality of video signal generation circuits to receive display data to be displayed on a plurality of display screens, each video signal generation circuit to receive display data from an associated frame buffer;
    at least one read controller to provide a plurality of read triggers, at least two of the read triggers being staggered, wherein the read controller is configured to stagger the read triggers based on dividing a total resolution supported by a display screen by a number of display screens supported; and
    at least one display control, in response to each read trigger, to read display data from a frame buffer of the plurality of frame buffers to an associated video signal generation circuit of the plurality of video signal generation circuits, each video signal generation circuit to provide the display data to an associated display screen of a plurality of display screens associated with the plurality of video signal generation circuits.

14. The apparatus of claim 13 wherein the read triggers are staggered to reduce a bandwidth required to read the display data relative to a bandwidth required to read the display data from the plurality of frame buffers at the same time.

15. The apparatus of claim 13 wherein the read controller is to stagger the read triggers based on a constant time interval.

16. The apparatus of claim 13 wherein the at least one read controller is configured to stagger the read triggers based on at least one of the number of video signal generation circuits in the plurality of video signal generation circuits and a refresh rate supported by each video signal generation circuit.

17. The apparatus of claim 13 wherein the at least one read controller is to stagger the read triggers based on at least one of a horizontal addressable video resolution, a vertical addressable video resolution, a total horizontal resolution supported by each video signal generation circuit of the plurality of video signal generation circuits and a total vertical resolution supported by each video signal generation circuit of the plurality of video signal generation circuits.

18. The apparatus of claim 13 wherein each video signal generation circuit of the plurality of video signal generation circuits supports the same resolution and refresh rate.

19. The apparatus of claim 13 further comprising a connection module to transmit a video signal to an associated thin-client.

20. The apparatus of claim 13 wherein each video signal generation circuit is associated with a thin-client connectable to an associated display screen.

21. The apparatus of claim 13 wherein the plurality of frame buffers form part of a server system configured to run virtualization software to provide software applications to a plurality of associated thin clients.

22. The apparatus of claim 13 further comprising:
a counter; and
wherein the at least one read controller is to generate a read trigger when the counter reaches a start count for each video signal generation circuit of the plurality of video signal generation circuits.

23. The apparatus of claim 22 wherein the start count for each video signal generation circuit is determined dynamically based on a number of displays supported.

24. The apparatus of claim 22 wherein the counter is a pixel counter.

25. An apparatus comprising:
a first means for providing a plurality of read triggers, at least two of the read triggers being staggered, and wherein the staggering of the read triggers is based on dividing a total resolution supported by a display screen by a number of display screens supported; and
a second means for, in response to each read trigger, reading display data from a frame buffer of the plurality of frame buffers to an associated video signal generation circuit of the plurality of video signal generation circuits, each video signal generation circuit to provide the display data to an associated display screen of the plurality display screens associated with the plurality of video signal generation circuits.

26. A non-transitory machine-readable storage medium embodying instructions that, when executed by a machine, cause the machine to perform operations comprising:
providing a plurality of read triggers, at least two of the read triggers being staggered, the staggering of the read triggers being based on dividing a total resolution supported by a display screen by a number of display screens supported; and
in response to each read trigger, reading display data from a frame buffer of the plurality of frame buffers to an associated video signal generation circuit of the plurality of video signal generation circuits, each video signal generation circuit to provide the display data to an associated display screen of the plurality display screens associated with the plurality of video signal generation circuits.

* * * * *